UNITED STATES PATENT OFFICE 2,036,905

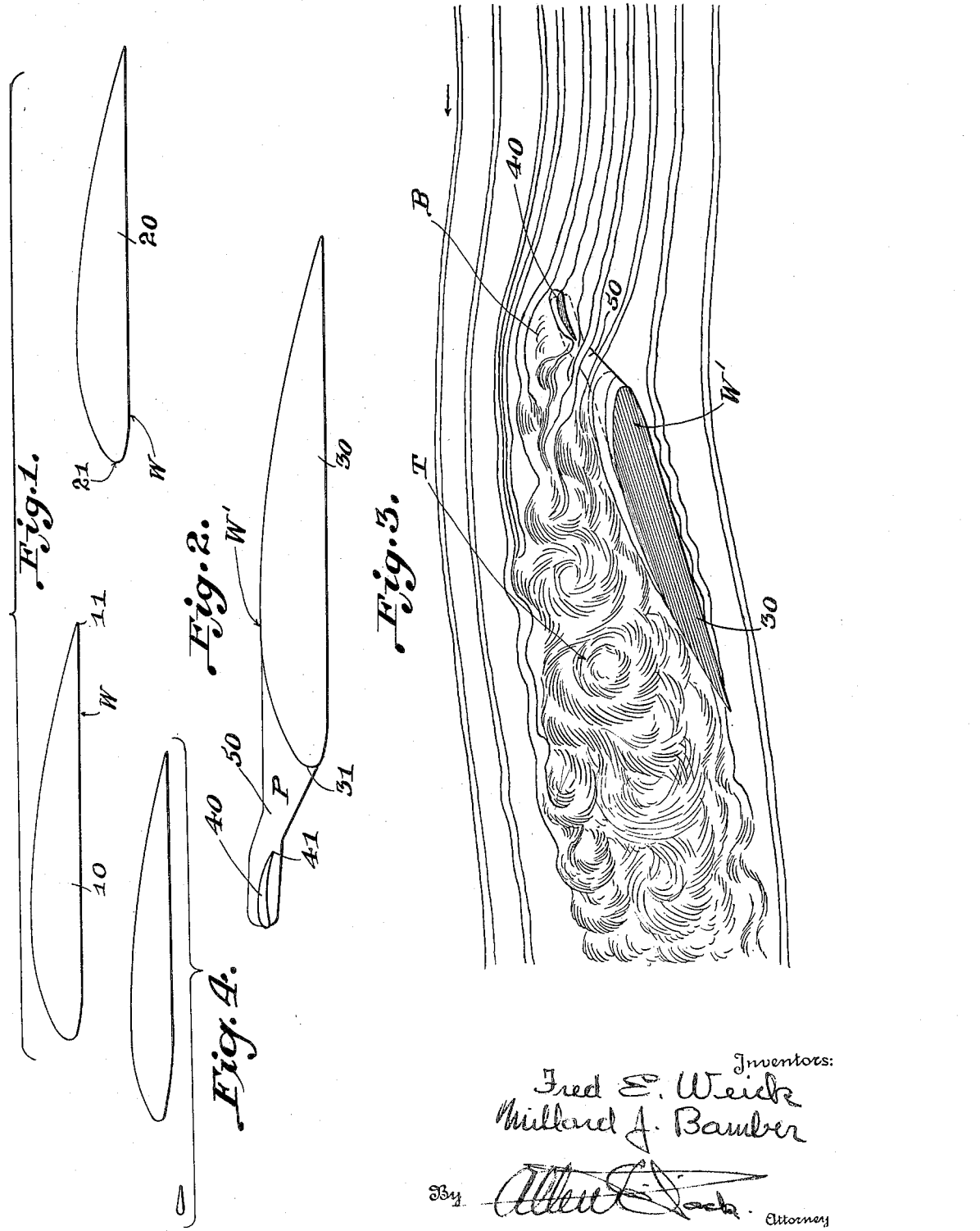

AIRPLANE WING

Fred E. Weick and Millard J. Bamber, Hampton, Va.

Application December 2, 1932, Serial No. 645,455

9 Claims. (Cl. 244—12)

This invention relates to certain improvements in airplane wings; and the nature and objects of the invention will be readily understood by those skilled in the art from the following explanation and description of the accompanying drawing illustrating what we at present consider to be the preferred embodiments or aerodynamical expressions of our invention from among various other forms, designs, arrangements and combinations of which the invention is capable within the spirit and the scope thereof.

Our invention is particularly directed to the provision of an airplane wing design and arrangement having the general object in view of increasing the speed range of an airplane by reducing the minimum or low speed thereof without substantial change in or decrease of the maximum or high speed of which the airplane is capable, thus making possible lower and safer landing speeds while increasing the flight efficiency and effectiveness of the airplane by the increase in speed range.

A further object and result of the wing design and arrangement of the invention having the fore-going characteristics of increased speed range with lower minimum and landing speeds, is found in the ability of the airplane to glide at low speeds and high angles of attack at a greatly increased angle of glide to the horizontal, that is, a much steeper flight path, but without materially increasing the minimum angle of glide of which the airplane is capable over the minimum glide angle for the airplane when equipped with a corresponding conventional wing, whereby accuracy of landing is improved and the landing distances over obstructions are shortened due to the increased range of gliding angles available to the pilot.

A feature and characteristic of the wing design and arrangement obtaining the above general results, resides in the provision of tandem or spaced airfoils or wings in which the front and rear airfoils or wings are so positioned relative to each other as to develop an inter-action and aerodynamic cooperation therebetween, such that a higher maximum lift coefficient is obtained for the combination, than for either of the individual airfoils or wings separately, and also the minimum flying speed possible for the combination is reduced over the same conventional wing area without substantial change or decrease in the maximum speed.

A further feature and characteristic arising out of the relative arrangement of the tandem airfoils or wings of the invention is that at the high angles of attack immediately below the maximum lift coefficient for the tandem arrangement, a much higher drag coefficient is obtained than with a corresponding conventional single wing, while at the lower angles of attack, around the maximum L/D, the drag coefficient is practically the same as that for the corresponding conventional wing.

Another object of the invention is to provide a method of increasing the lift of an airfoil or wing as the angle of attack increases up to a higher value and higher maximum lift coefficient, and of maintaining the lift with the wing at angles of attack beyond the normal stall angles for the wing, by directing a turbulent airflow rearwardly across and closely following the upper surface of the wing to sweep off the slow moving boundary layer of air therefrom and cause downward deflection of the airflow above the wing to maintain the wing lift.

A further object of our invention is to provide such a design and arrangement of tandem airfoils or wings, in which the wings are in fixed position relative to each other in order to eliminate moving parts and elements and the possibilities of mechanical or operating failures in flight, and also to require a minimum of added structure to reduce weight increases and to structurally simplify the practical design and arrangement from both the standpoint of production and of maintenance.

With the foregoing general objects, characteristics and results in view, as well as certain others which will be definitely recognized from the following explanation, the invention consists in certain novel features in combination and relative arrangement of parts and elements, and in the steps of the method disclosed, all as will be more fully and particularly referred to and specified hereinafter.

Referring to the accompanying drawing in which similar reference characters refer to corresponding parts throughout the several figures:

Fig. 1 is a purely diagrammatical view in end elevation and in outline, of a tandem wing design and arrangement in which the front and rear wings are relatively arranged in fixed position in accordance with our invention, the tandem wing being shown at low attack angle, high speed attitude.

Fig. 2 is a purely diagrammatical view in end elevation and outline, of a preferred design and form of tandem wing arrangement in which the front wing takes the form of an auxiliary airfoil, the tandem wing being shown in low attack angle, high speed attitude.

Fig. 3 is a purely diagrammatical view of the tandem wing of Fig. 3, but with the wing at high attack angle, low speed attitude and showing schematically the airflow paths across the auxiliary and main wing in accordance with the invention and the method thereof.

Fig. 4 is a purely diagrammatic view of a design and form of the wing arrangement in which the forward auxiliary airfoil is positioned with its chord line below the chord line of the rear or main wing.

We have diagrammatically disclosed and illustrated as examples, in the accompanying drawing, certain possible forms and designs of tandem wings embodying and incorporating our invention, for the purpose of describing the principles and several features of the invention to enable those skilled in the aeronautical art to fully comprehend the same. Obviously, as will be readily apparent to the workers in this art, the invention is capable of aerodynamical and structural expression in a variety of other forms and designs, and the method involved can be carried out by other arrangements, than the forms which we have selected for the present examples, and our invention includes all of such other forms, designs and arrangements, with their equivalents, that fall within the broad principles and scope of our invention.

One design and arrangement expressing the invention is illustrated in Fig. 1 of the drawing, and embodies a tandem wing W composed of the front airfoil or wing 10 and the rear airfoil or wing 20 spaced apart and preferably maintained in fixed positions relative to each other. Now in accordance with the principles and following the teachings of our invention, the front and rear airfoils or wings 10 and 20 of the tandem wing W, are in a certain definite relation and position with respect to each other, within a permissible range, in order to function to carry out the method and to secure the results of the invention. For instance, we happen to show in the tandem wing W of Fig. 1, the front and rear airfoils or wings 10 and 20 as substantially identical in section and as having approximately the same chord dimension, both wings being of the well known Clark Y section, although it is to be distinctly understood that the invention is not limited to any particular or specific airfoil section for the wings 10 and 20.

The front airfoil or wing 10 of the tandem wing W, is positioned spaced forward of and above the rear airfoil or wing 20, with the chord lines of the two wings substantially parallel, and the chord line of front wing 10 above the chord line of rear wing 20, disposed substantially in line with or in the plane of the highest elevation of the upper surface of rear wing 20. The trailing edge 11 of the front airfoil or wing 10 is spaced forwardly a distance from the leading edge 21 of rear airfoil or wing 20, to thus form a gap or passage between the wings spanwise thereof. Preferably the airfoils or wings 10 and 20 are in fixed positions relatively to each other so as to provide a unit structure forming the tandem wing W, in the manner generally typified by the form of wing disclosed in Fig. 2 of the drawing and to be referred to more fully hereinafter.

The tandem wing W has the forward airfoil or wing 10 located in such a position relative to the rear airfoil 20 such as the position disclosed by Fig. 1, that as the angle of attack of the combination or tandem wing W as a unit, increases and the forward airfoil 10 approaches or reaches stall angles, then the airflow over this forward airfoil or wing "burbles" and the turbulent airflow or wake therefrom passes rearwardly and sweeps over and rearwardly across the upper surface of the rear airfoil or wing 20. This results in an increase in lift of the rear airfoil or wing 20, as the angle of attack can be increased without stalling up to a higher value than for the rear wing alone, and a higher maximum lift coefficient is thus obtained.

However, the turbulent or "burbled" airflow over the forward airfoil or wing 10, which airfoil is stalled at an angle of attack well below the angle giving the maximum lift coefficient for the combination or tandem wing W as a unit, causes a high drag at the high angles of attack. The development of this high drag permits of steep angles of glide, while at the lower angles of attack with neither airfoil or wing 10 nor 20 stalled, the drag is approximately the same as for these airfoils separated and lacking mutual interference. This condition of relatively low drag at low angles of attack is mainly a result of the position of the forward and rear airfoils 10 and 20 of Fig. 1, with their chord lines substantially parallel.

In view of the fact that the rear airfoil or wing of a tandem wing, such as W, is greatly affected in a favorable sense by the presence and location of the forward airfoil or wing, we have in what we now consider a preferred design and arrangement of wing of our invention as disclosed in Figs. 2 and 3 of the drawing, provided for a forward airfoil or wing in the form of an auxiliary airfoil of less chord than the rear airfoil or main wing.

Referring now to Fig. 2 of the drawing, a form of tandem wing W' of our invention is disclosed as embodying the rear airfoil or wing 30, which may be termed the main wing, and a forward airfoil or wing 40, which may be termed the auxiliary airfoil. The rear or main wing 30 happens to be shown in the example hereof as of the Clark Y section, but any desired or suitable airfoil section for the purpose and in the combination with the forward or auxilary airfoil 40, may be utilized. The forward or auxiliary airfoil 40 is, in the present instance, of considerably less chord than the rear main wing 30, say of the order of one-seventh ($\frac{1}{7}$) or about 14.5 per cent that of the main wing. The forward or auxiliary airfoil 40, in the specific example here given is of a different airfoil section than that of the rear main wing 30, having a greater or higher camber in particular, as will be clear by reference to Figs. 2 and 3 of the drawing. While a particular section for the auxiliary airfoil is here shown, it is to be clearly understood that our invention is not so lmited, as any desired airfoil section, symmetrical or not, may be used, the section selected being of course governed to a certain extent by the section of the main, rear wing, the relative position of main and auxiliary wings, and other factors for the results in performance characteristics sought in any particular case.

In the wing W' of Figs. 2 and 3, the forward auxiliary airfoil 40 is mounted in a definite and positive position, or range of positions, with respect to the rear main airfoil 30, and is preferably fixed in the desired position, although provision for adjustment on its mounting is definitely contemplated by and included within the scope of our invention. For example, supporting plates, brackets or similar or equivalent structure, such as the plate 50 shown in Figs. 2 and 3, can be provided extending forwardly from the main wing 30 with the auxiliary forward airfoil 40 supported thereby and thereon in the required position forwardly of and with respect to the rear main wing 30. Such plates 50, or equivalent supporting and mounting structure, can be adjustable for varying the position of the auxiliary airfoil, or the auxiliary airfoil can be adjustably mounted on such structure, for instance, as by providing a plurality of locations thereon at which the auxiliary airfoil can be removably bolted, or otherwise suitably secured.

The relative mounting and positioning of the main wing 30 and auxiliary airfoil 40 of the wing W' of Figs. 2 and 3, provides for locating the auxiliary airfoil 40 spaced forwardly from the main wing with its chord line substantially parallel with but spaced above the chord line of the main wing 30, and with the chord line of the auxiliary airfoil disposed approximately in a plane passing through the upper surface portion of the main wing. In this position the auxiliary airfoil is spaced forwardly from the leading edge 31 of the main wing to provide the space or gap P therebetween, and in accordance with the requirements of this particular form of our invention, the distance between the forward airfoil trailing edge 41 and the rear wing leading edge 31, is in a range of approximately 15 to 20 per cent of the chord length of the rear, main wing 30. The mounting and positioning of the forward auxiliary airfoil 40 with its relatively short chord and high camber, with respect to the rear main wing 30, is also such that its trailing edge 41 is disposed at an elevation above the chord line of the main wing of approximately 10 to 18 per cent of the chord length of this main wing 30.

With the wing unit or tandem arrangement W' of Figs. 2 and 3, as defined above, the low attack angle or high speed attitude thereof in flight is indicated by its position of Fig. 2. At low attack angles in the range of maximum lift/drag, the drag coefficient for the wing W' is approximately the same as that of a single wing, of corresponding section and area, due primarily to the relative positioning which disposes the chord lines substantially parallel, so that, as will be clear from Fig. 2, at minimum or low attack angles of the combination or wing W', the forward auxiliary airfoil 40 is at corresponding low angles. By thus maintaining the drag coefficient at low attack angles for the combination approximately that of a single corresponding wing, an airplane with wing W' is capable of gliding at approximately as flat or small an angle to the horizontal, as an otherwise similar airplane with the corresponding single wing.

At high angles of attack of the wing W', referring now to Fig. 3 of the drawing, the forward auxiliary airfoil 40 may be completely stalled as indicated, and the airflow thereover is "burbling" as shown schematically by the airflow lines at B. The turbulent, "burbled" airflow sweeps rearwardly as a turbulent wake or flow T, over and across the upper surface of the rear, main airfoil or wing 30, and breaks up and moves or sweeps away the boundary layer of slow moving air on and over the main wing upper surface. This action of the highly turbulent stream of air or wake T rearwardly from the stalled forward auxiliary airfoil 40, may be aptly likened to and termed a "scouring" or rotary, whirling sweeping action which results in an effective breaking-up and removal of the slow-moving boundary layer of air. The airflow rearwardly, closely follows and conforms to the upper surface contour of main wing 30 and the whole body of rearwardly moving air above the wing is thus deflected downwardly and gives and maintains the wing lift, so that, as the angle of attack of the wing unit W' increases the lift developed by the rear wing 30 increases to a higher value than for the rear wing 30 alone, and a higher maximum lift coefficient is obtained.

The forward auxiliary airfoil is preferably so mounted and positioned with respect to the rear, main wing of the combination or tandem wing unit, that the auxiliary airfoil will reach a condition of stall at an angle of attack well below that angle of attack which gives the maximum lift coefficient for the combination or tandem wing unit. Preferably, the relative arrangement of the auxiliary and main wings is such that the auxiliary airfoil reaches a stall angle when the combination attains an angle of attack, say in a range of from 5° to 10°, depending of course upon each particular combination and arrangement of auxiliary and main airfoils or wings.

Due to the "burbled" turbulent flow of air over and rearwardly from the forward airfoil 40, referring to Fig. 3, which airfoil 40 as above pointed out is stalled at an angle of attack considerably below the angle at which the combination develops its maximum lift coefficient, a relatively high drag for the combination results at high angles of attack. It is this high drag that allows the steep angles of glide, so that the airplane can glide at greatly increased angles to follow a much steeper flight path. As the ability to glide at substantially as flat or small angles as the corresponding single wing at low attack angles is retained, it follows that a greatly increased range of guiding angles is obtained over the range possible to an airplane with the corresponding single wing. With such increased gliding angle range, an airplane with a wing of the invention can be landed over obstructions in much less distance and the accuracy and safety of landing is materially increased, because of the wider range of guiding angles within which the pilot may safely glide the airplane.

A higher maximum lift coefficient is obtained by a tandem wing unit arrangement of the invention, based on the total area, than by a corresponding single wing, which results in lower minimum landing speed, but without substantial decrease or change in the maximum speed, thus materially increasing the speed range in the direction of increasing flight and landing safety. The ratio of such increased speed range may be expressed as the maximum lift coefficient ($C_L$ max.) divided by the minimum drag coefficient ($C_D$ min.). On the other hand, if the same minimum speed should be desired as for the corresponding single wing, the wing area of the combination of forward and rear wings can be reduced. Such area reduction will then result in an increase of the maximum speed, while at the same time reducing the size and weight of the wing, as will be readily understood by those skilled in this art.

We find that the preferred chord length for the auxiliary airfoil 40, lies in a range of from approximately 12 per cent to approximately 15 per cent of the chord length of the main wing 30, although the chord length of the forward air foil or wing is not an essentially critical factor because an improved performance is obtained over the main wing alone with forward or auxiliary airfoils of much greater or lesser chord lengths than within the chord range as stated.

Attention is also directed to the fact that the maximum performance results are obtained with the chord lines of the forward and rear airfoils or wings substantially parallel and the trailing edge 41 of forward or auxiliary airfoil 40 located a distance spaced forwardly or ahead of the leading edge 31 of the rear wing equal to approximately 16 per cent of the chord length of the rear wing 30. The requirement for the positioning of the forward and rear wings or airfoils with their chord lines "substantially" or "approximately", parallel is intended to cover and include positioning within a range of from about 3° to 4° of true parallelism.

It is to be further noted that the vertical position of a forward or auxiliary airfoil with respect to the rear or main airfoil of a wing unit of our invention, is related to and dependent upon the size, that is chord length, of the forward or auxiliary airfoil, and also to a certain extent upon the airfoil section employed for the auxiliary airfoil. For instance, with an auxiliary airfoil having a chord length of 12 per cent to 15 per cent of the chord length of the rear airfoil, the chord line of the auxiliary airfoil should be approximately a distance above the chord line of the main airfoil or wing, equal to 12 per cent of the chord length of the main airfoil or wing. This preferred distance remains about the same as the chord length of the auxiliary airfoil is increased up to about 25 per cent of the chord length of the rear or main wing. This distance of the forward wing above the chord line of the rear or main wing should, however, be reduced if the chord length of the auxiliary wing is decreased, to the point where both chord lines are at approximately the same elevation when the chord length of the auxiliary or forward airfoil is 7.5 per cent of the chord length of the main airfoil.

While in the foregoing explanations and description, the forward or auxiliary airfoil is referred to as positioned above the chord line of the rear or main airfoil, our invention in all its forms is not so limited. For example, where an auxiliary airfoil may be employed having a chord length of say less than 7 per cent of the chord length of the main or rear airfoil, the optimum location for such an auxiliary airfoil is with its chord line slightly below the chord line of the main airfoil, as shown in Fig. 4 of the drawing.

The invention hereof embodies and presents a method of increasing and maintaining the lift developed by an airfoil or wing, up to and beyond the normal stall angles of the wing, and this method involves the essential step of suitably creating a turbulent air flow and directing it rearwardly across the upper surface of the wing, so as to cause such turbulent airflow to closely follow the upper surface and "scour" and sweep off from the wing upper surface the slow moving boundary layer of air. By thus directing an airflow of such a turbulent character rearwardly across the upper surface contour of a wing, there is a breaking-up and "scouring" away of the dead, slow-moving layer of air, and the airflow above the wing is bodily deflected downwardly from the wing to develop lift. It is the turbulent, whirling character of the rearwardly directed airflow, as distinguished from a relatively smooth, unbroken flow, that obtains the efficient and effective breaking up and "scouring" away of the dead, slow-moving boundary layer above the wing and results in the downward deflection of the rearwardly moving body of air above the wing following the wing upper surface contour. While such a turbulent, whirling airflow is preferably created and rearwardly directed over the upper surface of a wing by stalling an airfoil at the proper position in front of and with respect to a wing, other means or instrumentalities can be utilized to carry out such steps of forming the turbulent airflow of the required character and rearwardly directing it over a wing upper surface to perform the "scouring" and breaking-up action. Hence, both from the standpoint of design and structure, and of the method involved, our invention in its broad aspects is not limited to the forward or auxiliary airfoil as the medium by which the lift increasing and maintaining method may be carried out.

A wing design and arrangement of our invention embodying the forward and rear, or tandem, airfoil or wings, can be used to provide a monoplane wing, or to provide either or both wings of a biplane wing cellule, or any or all of the wings making up a multiplane wing cellule. Attention is further directed to the fact that while the invention is here disclosed as having the tandem wing arrangement fixed, for purposes of structural and operating efficiency and safety the invention contemplates and includes arrangements where one or the other wing, or a part of either wing, making up the combination or tandem wing unit, can be angularly deflected by any suitable means, such as any of the well known parallel operating mechanisms, for the purpose of generating rolling moments to give lateral control. Similarly, as hereinbefore referred to, provision for adjustment in the relative positions of the forward and rear airfoils or wings is included within the scope of our invention.

It is also evident that various other changes, modifications, substitutions, eliminations and additions might be resorted to without departing from the spirit and scope of our invention, and hence, we do not wish to limit ourselves in all respects to the exact and specific disclosures hereof.

What we claim is:

1. An airplane wing embodying a forward airfoil and a rear airfoil positioned with their chord lines substantially parallel, the forward airfoil having a chord length approximately 14.5 per cent of the chord length of the rear airfoil and positioned with its chord line spaced above the chord line of the rear airfoil and its trailing edge spaced forwardly a distance from the leading edge of the rear airfoil equal to approximately 15 to 20 per cent of the chord length of the rear airfoil.

2. An airplane wing embodying a forward airfoil and a rear airfoil positioned with their chord lines substantially parallel, the forward airfoil having a chord length approximately 12 to 15 per cent of the chord length of the rear airfoil, and the forward airfoil disposed in position relative to the rear airfoil so that the forward airfoil trailing edge is spaced forwardly from the rear airfoil leading edge a distance equal to approximately 15 to 20 per cent of the chord length of the rear airfoil, and is disposed a distance above the rear airfoil chord line a distance equal to approximately 10 to 18 per cent of the chord length of the rear airfoil.

3. An airplane wing embodying a forward airfoil and a rear airfoil positioned with their chord lines substantially parallel, the forward airfoil having a chord length not exceeding approximately 7 per cent of the chord length of the rear airfoil and positioned with respect to the rear airfoil such that its chord line is disposed a slight distance below the chord line of the rear airfoil.

4. An airplane wing including a forward airfoil and a rear airfoil positioned with their chord lines approximately parallel, the forward airfoil spaced forwardly from the leading edge portion of the rear airfoil a distance of approximately 15 to 20 per cent of the chord length of the rear airfoil, and the chord length of the forward airfoil less than the distance between the leading edge of the rear airfoil and the trailing edge of the forward airfoil.

5. An airplane wing including a forward airfoil and a rear airfoil positioned with their chord lines approximately parallel and in substantially the same plane, the forward airfoil having a chord length approximately 7.5 per cent of the chord length of the rear airfoil and positioned with its trailing edge spaced forwardly from the nose of the rear airfoil a distance approximately 15 to 20 per cent of the chord length of the rear airfoil.

6. An airplane wing including, a forward airfoil and a rear airfoil positioned with their chord lines within approximately 3° to 4° of true parallelism, the forward airfoil having a chord length within the range of approximately 7.5 per cent to approximately 25 per cent of the chord length of the rear airfoil and positioned with its chord line spaced above the chord line of the rear airfoil a distance equal to approximately 10 per cent to 18 per cent of the chord length of the rear airfoil, and said forward airfoil positioned with its trailing edge spaced forwardly from the leading edge of the rear airfoil a distance greater than the chord length of the forward airfoil to form a gap between the forward and rear airfoils.

7. A compound lifting surface comprising a rear airfoil and a forward airfoil disposed with their chord lines substantially parallel, the chord length of the forward airfoil being between approximately 7 per cent to 25 per cent of the chord length of the rear airfoil, the forward airfoil mounted in a fixed position relative to the rear airfoil with its trailing edge spaced forward of the leading edge of the rear airfoil a distance greater than the chord length of the forward airfoil whereby the forward airfoil stalls at high angles of attack of the rear airfoil to create a turbulent wake flowing rearwardly across and closely following the upper surface of the rear airfoil.

8. A compound lifting surface comprising a forward airfoil and a rear airfoil in normally fixed position with their chord lines substantially parallel, the forward airfoil having a chord length approximately 7.5 to 25% of the chord length of the rear airfoil and being positioned with its chord line spaced from 10 to 18 per cent of the rear airfoil chord length above the chord line of the rear airfoil and said forward airfoil positioned with its trailing edge spaced forwardly from the leading edge of the rear airfoil a distance equally approximately 15 to 20 per cent of the chord length of the rear airfoil.

9. A compound lifting surface comprising a rear airfoil and a single forward airfoil in normally fixed position with their chord lines substantially parallel, the forward airfoil having a chord length in the range from less than approximately 7 per cent to approximately 25 per cent of the chord length of the rear airfoil, said forward airfoil positioned vertically relative to the rear airfoil in the range of positions from a position with its chord line below the chord line of the rear airfoil when the forward airfoil has a chord length of less than approximately 7.5 per cent to a position with its chord line above the rear airfoil chord line when the forward airfoil has a chord length greater than approximately 7.5 per cent of the chord length of the rear airfoil, and the forward airfoil positioned with its trailing edge spaced forwardly from the leading edge of the rear airfoil a distance greater than the chord length of the forward airfoil.

FRED E. WEICK.
MILLARD J. BAMBER.